Figure 1:
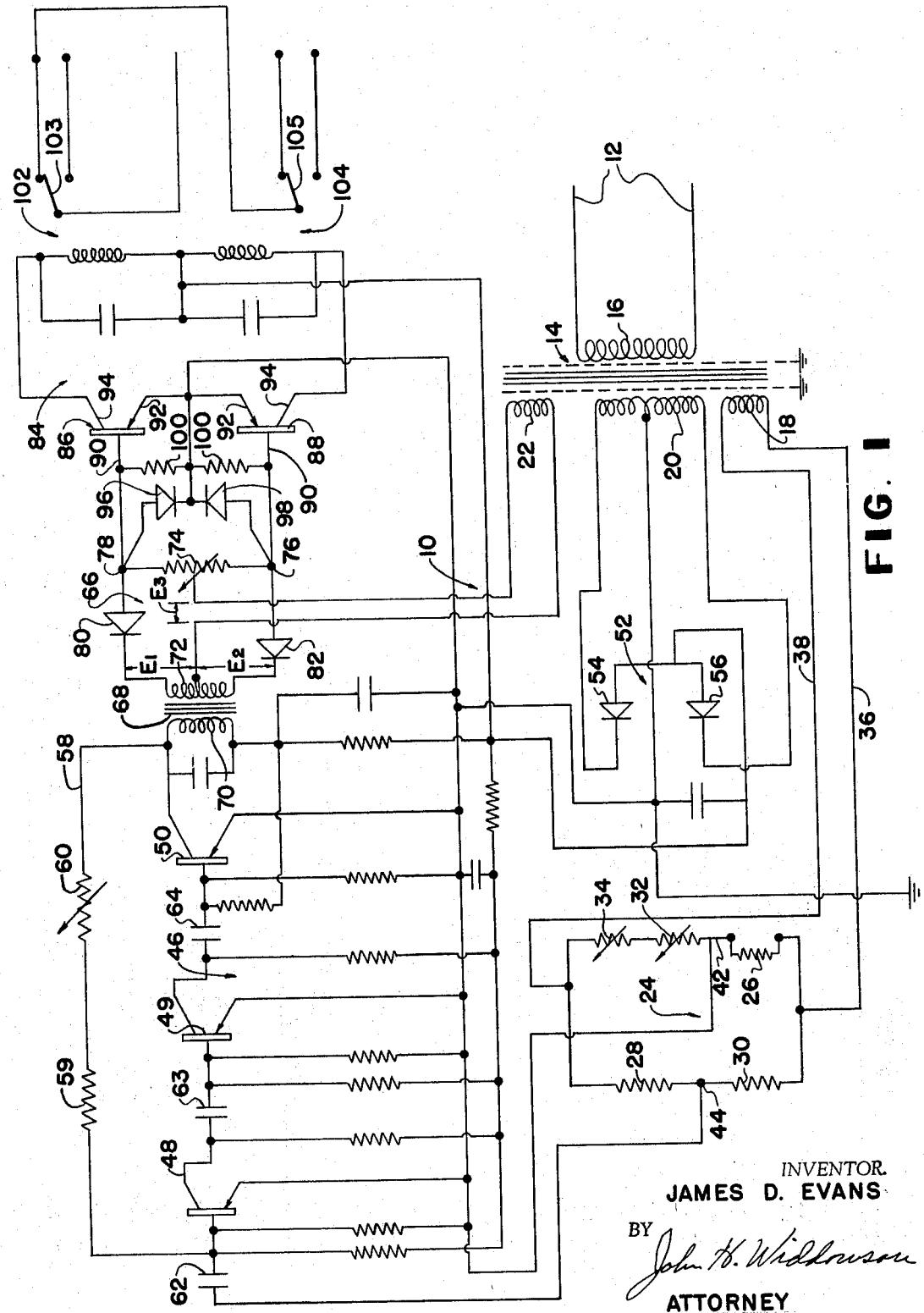

Dec. 20, 1966  J. D. EVANS  3,292,687
CONTROL MEANS
Filed June 15, 1964  2 Sheets-Sheet 1

INVENTOR.
JAMES D. EVANS
BY John H. Widdowson
ATTORNEY

INVENTOR.
JAMES D. EVANS
BY
John H. Widdowson
ATTORNEY

3,292,687
CONTROL MEANS
James D. Evans, 320 Spring Valley Court,
Huntsville, Ala. 35802
Filed June 15, 1964, Ser. No. 375,229
5 Claims. (Cl. 165—26)

This invention relates to control means. More specifically this invention relates to control apparatus for controlling a physical variable. A specific embodiment of the invention relates to a control apparatus particularly adapted to maintain a constant temperature in a liquid bath. Specifically the invention relates to a control apparatus having a transducer to produce a modulated electrical signal, a demodulator to receive and modify the signal, and a switching circuit to interpret the modified signal that is responsive to variations in the signal to energize means to apply corrective forces to the variable being controlled.

Control apparatus having a sensing element responsive to a condition in the system adapted to apply a corrective means thereto in response to a signal from the sensing element is in general old, as for example a thermostat associated with a furnace in a house or building. However, when conditions in a system must be very closely controlled to maintain a uniform environment more than a single corrective force must often be applied. An example of such a situation is a liquid bath used in the developing process of photography, and the like. In such baths the temperature of the bath is desirably positively maintained to within a fraction of a degree of the desired optimum temperature. In order to achieve this desired degree of control both a heating means and a cooling means are utilized and their operation correlated. Control apparatus to achieve such control of both heating and cooling means or other analogous correcting means use separate units associated with each means. However, in such an apparatus the calibration of the units is preferably very carefully maintained to provide efficient operation. If it is not maintained the situation arises where both the heating and cooling means, or other analogous corrective means, are running simultaneously. Further, due to the inherent and unavoidable variance of the electrical properties of the apparatus with temperature, humidity, and the like the known apparatus for achieving the relatively precise desired control is not satisfactory, particularly when the allowable deviation from the temperature is very small. Another known solution to the problem is to employ a transducer element having a sensing element responsive to temperature variations, or other types of variables sought to be controlled, which produces a single signal which is utilized to alternately control energization of both heating and cooling need or other analogous corrective forces. The known type of apparatus for achieving this objective are complicated and expensive, are difficult to keep in calibration, require elaborate amplifying apparatus to obtain the desired signal at the necessary power level, and do not in general provide a "dead spot" where neither heating or cooling apparatus is operated, when the temperature, or other variable being controlled, is exactly at the desired value. With known control means there is a constant fluctuation of the temperature of the bath, or other variable, since the heating means and cooling means, or other corretcive forces are alternately energized. This constant fluctuation is undesirable and also inefficient in that power is required to maintain the heating and cooling means or other corrective forces in operation.

I have invented new switch means for energizing associated electrical circuits in response to a relatively small electrical control signal. The switch means has first and second input terminals. Also included are first and second means to energize electrical circuits. The means to energize can be associated with an electrical circuit which in practice can be used to activate appropriate apparatus. Also included in my switch means is first and second amplifier means. The amplifier means each have an input control terminal, and input and output load terminals. The input control terminals of each amplifier means are connected to an input terminal of the switch means. Also provided is a source of unilateral voltage. The input and output load terminals of the first amplifier means, the source of unilateral voltage, and the first means to energize are connnected in a first circuit. The source of unilateral voltage, the input and output load terminals of the second amplifier means, and the second means to energize are connected in a second circuit. A first unilateral conduction device is connected across the first input terminal of the switch means and the input load terminal of the second amplifier means. A second unilateral conductive device is connected across the second input terminal of the switch means and the input load terminal of the first amplifier means. The switch means is adapted in use to selectively energize the associated electrical circuits in response to a relatively small electrical control signal applied across the first and second input terminals of same.

I have invented a new combination of elements control means. This new control means of my invention has a source of alternating voltage, and a transducer sensitive to a condition to be controlled to produce a modulated voltage signal which varies in amplitude and phase in response to an environment deviation. A discriminator means is provided to receive the voltage signal and operate on same to produce an output voltage signal which reflects the phase reversal. The new switching means of my invention is employed to receive the output signal of the discriminator means. Means to apply corrective force to the environment being controlled is provided. The switching means in response to the output signal will energize the means to apply corrective force to thereby restore the environment controlled to the desired condition.

The control means of my invention overcomes all of the problems associated with analogous control means known to the prior art. My control means utilizes a single transducer signal to control energization of both heating and cooling means, or other suitable means to restore a variable in the system to a desired value, thereby eliminating the necessity of correlating parallel circuits calibrating, etc. as is necessary in certain control means known to the prior art. My control means as a result is efficient and dependable in operation. My control means has a "dead spot" at the desired temperature, or other condition being controlled, wherein neither cooling or heating apparatus, or other means to correct a deviation therefrom, is in operation. The size or the "dead spot" can be enlarged or decreased to give any suitable allowable temperature range or other environmental condition deviation before the corrective means are energized. Since the apparatus of my invention utilizes a single transducer A.C. signal to control all corrective means the amplifier for amplifying the same can be very simple. Due to the simplicity of the amplifier, the overall cost is low. Further the control means is dependable and easy to operate. The new control means of my invention is easy to calibrate and maintain. A relatively inexperienced operator can readily make the necessary simple adjustments to achieve a high degree of accuracy of control.

An object of this invention is to provide a new control means.

Another object of this invention is to provide a new switch means.

Still another object of this invention is to provide a new control means for maintaining a constant environment or relationship in a system.

Still another object of this invention is to provide a control means that has a "dead spot," where no corrective means is energized when there is no deviation from the desired condition.

Yet another object of this invention is to provide a new control means that is efficient and dependable in operation.

Another object of this invention is to provide a control means wherein a simple amplifier means is sufficient to amplify the transducer signal.

Another object of this invention is to provide a new control means that is inexpensive to manufacture and to maintain in operation.

An object of this invention is to provide a switch means for controlling associated power circuits that is responsive to a relatively small control signal of varying polarity.

Other objects and advantages of this invention will be apparent to those skilled in the art from the disclosure set forth herein.

Drawings of preferred specific embodiments of the invention accompany and are part hereof, and such are to be understood to not unduly limit the scope of the invention. In the drawings, FIG. 1 is a schematic representation of new control means of my invention, depicting a preferred specific embodiment of the new switching means of my invention in cooperating combination with other preferred circuits and elements to provide a preferred specific embodiment of the new combination of elements of my invention.

FIGS. 2–5 are schematic diagrams of preferred specific embodiments of transducers adapted to be used in the new combination control apparatus of my invention, in cooperating combination with the new switching means of my invention.

The following is a discussion and description of the new switch and conrtol means of my invention made with reference to the drawings, wherein the same reference numerals are used to indicate the same or similar parts and/or structures. The discussion and description are of preferred specific embodiments of the new control means of my invention, and it is to be understood that such are not to unduly limit the scope of my invention.

Referring now to the drawings, there is depicted a preferred specific embodiment of my invention, namely a control means 10 for maintaining a constant temperature in a liquid bath. A source of electric current 12 is provided. The source of alternating electric current is connected to a transformer 14 having a primary winding 16, a first secondary winding 18, a second center tapped secondary winding 20, and a third secondary winding 22, all inductively coupled to the primary winding 16. A transducer 24 is provided having a thermistor 26 sensitive to temperature variations in the liquid bath being controlled. The thermistor 26 is an element that will change its electrical resistance with a change in temperature. The transducer 24 is a Wheatstone bridge circuit having two resistors 28 and 30 in one arm, and a variable resistor 32 and thermistor 26 in series in the other arm. Preferably, a second relatively small variable resistor 34 is provided in the second arm in series with resistor 32 and thermistor 26. Variable resistor 32 provides a means for controlling the temperature and variable resistor 34 is a temperature calibration control for the Wheatstone bridge. Conductors 36 and 38 connect the ends of the two aforementioned arms of the Wheatstone bridge to the opposite terminals of secondary winding 18 in transformer 14. The output terminals of the transducer 24 are 42 and 44 positioned in the midpoint of the respective arms of the Wheatstone bridge circuit. With the arrangement previously described an alternating electrical signal is thereby impressed across the legs. When resistances are in balance no signal appears on the terminals 42 and 44. In operation variable resistance 32 is adjusted so that at the desired temperature of the bath the bridge will be in balance and no signal will appear at terminals 42 and 44. This is the "dead spot." However, if the temperature of the bath deviates from the desired temperature the bridge is out of balance and a modulated alternating voltage signal appears across terminals 42 and 44. The modulated signal from the bridge output reverses phase as it goes through the zero point or "dead spot." For example, if the alternating signal at the output terminals 42 and 44 is in phase with the alternating current at the secondary 18 of the transformer 14 when the temperature deviation detected by the transducer is above the desired temperature to be maintained, the signal will reverse phase when the temperature deviation is below the desired temperature with respect to the secondary 18.

An amplifier 46 is provided to receive the modulated transducer signal. The amplifier 46 can be of any suitable type. The amplifier illustrated in the drawings has a plurality of transistors 48, 49, and 50 arranged in cascading relation and are suitably biased by a source of D.C. current 52. A suitable means for providing D.C. current is a full wave rectifier 52 having diodes 54 and 56 arranged to pick off a suitable voltage from the center tapped secondary 20 of transformer 14. The circuitry of the rectifier is common and usual and will not be commented on further. The output of the rectifier circuit is utilized to supply a biasing current to the bases of transistors 48, 49 and 50 in the amplifier 46 and also to provide the collector emitter currents used therein. A feedback circuit 58 having resistor 59 and variable resistor 60 is provided to pary the amplitude of the transducer signal and thereby vary the size of the "dead spot." Suitable condensers 62, 63 and 64 are used to convey the signal to the succeeding stages of the amplifier.

A one-half wave-type discriminator demodulator means 66 is provided to receive the resultant amplified modulated transducer signal from the amplifier 46. The discriminator 66 has a transformer 68, having a primary winding 70 receiving the amplified transducer signal, and a center tapped secondary winding 72 inductively couwinding 70 receiving the amplified transducer signal, and a center tapped secondary winding 72 inductively coupled to primary winding 70. A center tap resistance element 74 having end terminals 76 and 78 is provided. Preferably the center tap of the resistance 74 is movable in order to allow calibration or adjustment of the discriminator 66. A first diode 80 is connected between the terminal 78 of resistor 74 and the end terminal of secondary winding 72. A second diode 82 is connected between terminal 76 of resistor 74 and to the opposite terminal of the secondary winding 72 of transformer 68. The end terminals of secondary winding 22 of transformer 14 are connected across the center terminal of secondary winding 72 of transformer 68 and the center terminal of resistance 74. The secondary winding 22 introduces a reference alternating electric signal to the discriminator 66. The output of discriminator 66 appears at the end terminals 76 and 78 of resistor 74. The discriminator circuit 66 is a phase sensitive rectifier which compares the modulated signal from the amplifier 46 to a reference alternating signal obtained from the secondary 22 of transformer 14. When there is no input signal from the amplifier 26 voltages $E_1$ and $E_2$, supplied by the center tapped transformer, are zero and each rectifier circuit operates with the same alternating input voltage $E_3$. Therefore each one produces the same magnitude D.C. output voltage, and the net output voltage appearing across terminals 76 and 78 is zero. An input signal from the bridge and amplifier changes matters. Equal voltages $E_1$ and $E_2$ now appear to upset the balance. With one phase of input voltage, $E_1$ will add to $E_3$ and increases the output of the upper circuit. At the same time $E_2$ subtracts from $E_3$ to decrease the lower circuit output. With this unbalance the two D.C. outputs no longer cancel in resistor 74 and the upper circuit terminal becomes positive. Reversing the input voltage phase makes $E_2$ subtract from $E_3$, and add to $E_3$, whereupon the lower output exceeds the upper and the output voltage reverses. In this way the discriminator circuit provides a rectified output proportional to the input signal and of the proper polarity.

A novel switching circuit means 84 of my invention is provided to receive the output from discriminator circuit means 66. The switch means has PNP type transistors 86 and 88, each having a base 90, an emitter 92, and a collector 94. If desired NPN type transistors could be used if suitable modification were made to the circuit, or other types of switching devices. As indicated on the circuit diagram the base 90 of transistor 86 is connected to output terminal 78, and base 90 of transistor 88 is connected to output terminal 76 of discriminator means 66. The emitters 92 of transistors 86 and 88 are connected. Diode 96 is connected across the emitters and terminal 78, and diode 98 is connected across the emitters and terminal 76. The emitters of transistors 86 and 88 are connected to a source of D.C. current, in this instance the rectifier circuit 52. The bases 90 of transistors 86 and 88 are appropriately biased through resistors 100. Transistors 86 and 88 can be either NPN or PNP type, or can be other suitable types of switching devices as for example vacuum tubes, relays or the like. First and second relay switches 102 and 104 are arranged to be activated by the transistors 86 and 88. Switches 102 are arranged to energize cooling and heating apparatus for cooling and heating the liquid baths being controlled. In this instance relay 102 is connected to energize a cooling apparatus for the liquid bath, as for example the compressor of a refrigerating means. The relay 104 is connected to energize a heating unit for the liquid bath, as for example an electric resistance heater. The relay switches 102 and 104 are preferably of the relay type in which a small control current circuit is used to open and close electrical contacts to control an auxiliary circuit having a higher amperage and/or voltage characteristics. As indicated on the schematic drawing in FIG. 1, one input control terminal of switch 102 is connected to the collector 94 of transistor 86, and an input control terminal of switch 104 is connected to the collector 94 of transistor 88. The opposite input control terminals of relay switches 102 and 104 are connected to the opposite terminal source of the current that is connected to emitters 92.

The switching circuit just described works as follows, when the temperature in the bath being controlled is at the desired temperature the bridge circuit 24 is in balance and no signal is transmitted to the amplifier and demodulator discriminator circuit. Consequently the voltages introduced in resistor 74 by the parallel circuits in the discriminator demodulator are equal and in opposite directions and therefore cancel each other out. Therefore the sum voltage across terminals 76 and 78 is zero. The base currents in transistors 86 and 88 are both zero. This is the cutoff bias for the transistors. Consequently no current will flow through the collector and emitters of the transistor to energize relay switches 102 and 104. This is the null point.

When the bridge circuit 24 is unbalanced an error signal is produced which is amplified by the amplifier 46 and transmitted to the discriminator demodulator means 66. There will be produced a potential difference between the terminals 76 and 78 of the discriminator means. The polarity of terminals 76 and 78 will depend upon whether the unbalance detected by the transducer 24 is above or below the desired condition that is to be maintained. If for example terminal 78 is negative with respect to terminal 76, the negative voltage will be applied to the base 90 of transistor 86, and a base current will therefore flow. The path that this base current takes is from terminal 76, through diode 98 to emitter 92 of transistor 86, out through base 90, and back to terminal 78. This base current will cause a larger current to flow in the collector circuit of transistor 86. The larger current will flow through the input flow circuit in relay switch 102 causing the electrical contacts 103 in the secondary circuit to close. Upon closing the electrical contacts of the secondary circuit the cooling means, as for example the compressor of a refrigeration unit, to be activated which action will lower the temperature in the liquid bath. The base current in transistor 88 will be essentially zero due to a lack of voltage source of the proper polarity, namely terminal 76.

In contrast, when the signal from the transducer amplified in amplifier 46 has the effect of making terminal 76 of resistor 74 negative with respect to terminal 78, relay switch 104 will be energized for basically the same reasons explained heretofore with respect to relay 102. Upon closing the terminals 105 in relay switch 104 a heating means will be energized which will heat the liquid bath being controlled.

There are a great number of applications for the control means of my invention. In the specific embodiment of my invention depicted in the drawings the only requirement that the control circuit places on the transducer is that the transducer provide an amplitude modulation to the carrier and reverse the phase of the carrier with respect to the demodulator reference carrier when the error signal goes through the null region. This requirement is met by the bridge circuit shown. The bridge can be a resistance bridge, an inductance bridge, a capacitance bridge, or a variable reluctance bridge. As there are a number of types of devices which can be used in a bridge in which the electrical resistance of the device is a function of the variable sought to be controlled, the control means can be used to efficiently and positively control the variable. Examples of various types of devices that can be incorporated into a resistance bridge sensing device are, a thermistor which changes resistance with temperature, a photo-conductance photo-cell which changes resistance with light, a humidity sensor which changes resistance with humidity, a strain gauge which changes resistance with deformation, etc.

Figure 2:
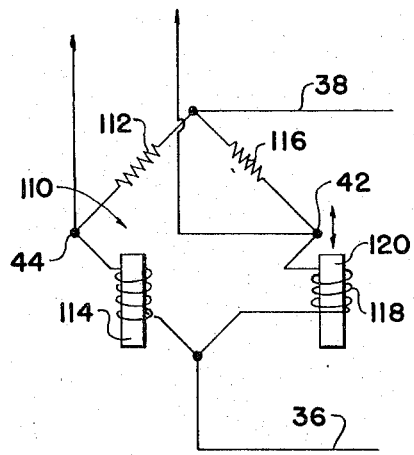

Various types of transducers can be used in my control means to adapt same for a great number of differing types of control applications. In FIG. 2 is depicted an inductance bridge for use in the control means of my invention as a transducer. The transducer 110 has two legs, each leg having a resistor and an inductance element in series. In FIG. 2 there is shown a resistor 112 and an inductance 114 in one leg thereof, and a resistance element 116 and a variable inductance element 118 in the other leg. The variable inductance element 118 has a movable core 120 associated with the variable being controlled. The source of alternating voltage is connected across the legs with conductors 36 and 38. The output terminals 42 nad 44 are positioned between the resistors and inductance elements of the legs.

Figure 3:
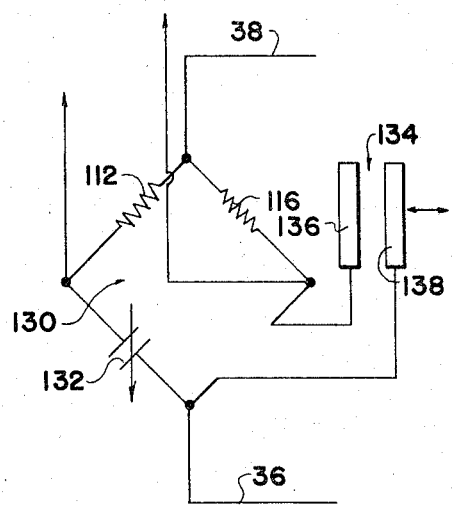

In FIG. 3 is shown still another transducer 130 that can be utilized in the control apparatus of my invention. The transducer 130 has a capacitance bridge circuit. The bridge circuit has two legs, each leg having a resistor and a capacitance element in series. As shown in FIG. 3 one leg is comprised of a resistor 112 and a capacitor 132, preferably variable, and the other leg has a resistor 116 and the variable capacitor 134. Variable capacitor 134 has a stationary plate 136 and a movable plate 138 which is associated with the variable being controlled. The spacing between the plates 136 and 138, assuming a constant dielectric, determines the capacity of the capacitor. The source of alternating voltage is connected across the legs with conductors 36 and 38 respectively. The output terminals of the transducer are positioned between the resistor and capacitor element in each leg.

Figure 4:
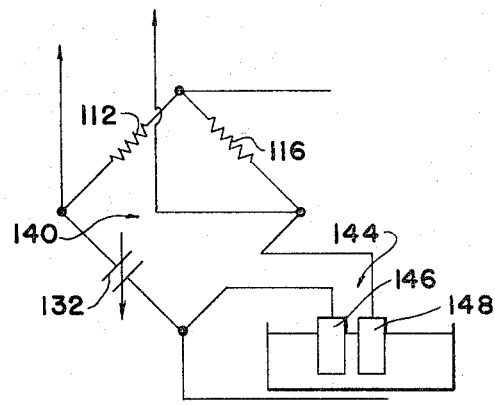

In FIG. 4, is depicted still another transducer 140. The transducer 140 has a capacitance bridge circuit having two legs, each leg having a resistor and a capacitor element therein. Capacitor element 144 has two spaced plates 146 and 148 adapted to be immersed in a liquid or other type of dielectric. The capacitance of the capacitor element 144 varies in accordance with the dielectric, in this instance the liquid or other type of dielectric. As depicted in FIG. 4, plates 146 and 148 are preferably maintained in a uniform spaced relationship. The capacitor element 144 will change capacitance when (1) the liquid dielectric level is varied and/or (2) the dielectric properties of the liquid vary. This type of transducer device can be used to measure liquid level or to control the dielectric properties of the liquid.

Figure 5:
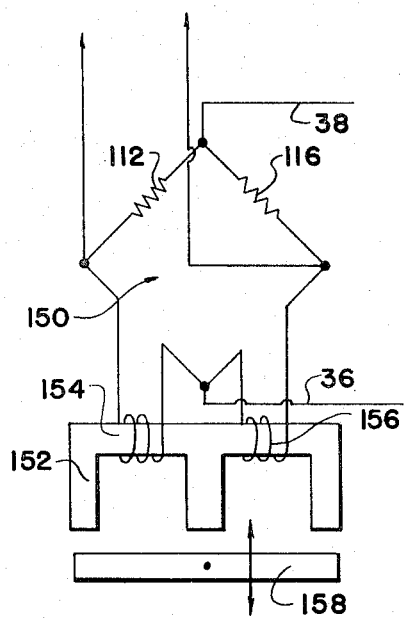

Still another type of transducer that can be utilized in the control means of my invention is depicted in FIG. 5. The transducer 150 is a reluctance bridge transducer. The bridge is comprised of two legs, each leg having a resistor element and an inductance coil. The coils 154 and 156 are mounted on an E core 152. As shown in FIG. 5 coil 154 is positioned in the leg with resistor 112 and coil 156 is positioned in the leg of the bridge with resistor 116. A bar 158 is pivotally mounted adjacent the end of the E core 152 which provides a means of varying the air gap at the outer two legs of the E core. The bar 158 is associated with the variable being controlled. Pivoting of bar 158 produces a differential change in coil inductance. A source of alternating voltage is connected across the legs of the reluctance bridge by conductors 36 and 38 as shown.

As it will be obvious to those skilled in the art, various changes and modifications of the preferred control means of my invention and elements thereof can be made without departing from the spirit of the disclosure or from the scope of the claims.

I claim:

1. A control means for maintaining a constant temperature in a liquid bath comprising, a source of alternating voltage, a first transformer having a primary winding operatively connected to said source of voltage, a first secondary winding, a second center tapped secondary winding, and a third secondary winding, a transducer comprising, a thermistor arranged to be responsive to temperature in said liquid bath, a Wheatstone bridge circuit having two resistors in series in one arm, and a variable resistor and said thermistor in series in the other arm, conductors connecting the terminal ends of the arms of said Wheatstone bridge circuit to said first secondary winding of said first transformer, transducer signal output terminals on the Wheatstone bridge circuit, one terminal being between the resistors on the one arm, and the other terminal being between said variable resistor and said thermistor on the other arm, an amplifier means having an adjustable degenerative feedback means, conductor means for supplying the transducer signal to the input of said amplifier means, a full-wave rectifier circuit means connected to said second center tapped secondary winding of said first transformer, conductor means for connecting the resultant direct current voltage output of said rectifier circuit means to said amplifier means for energization thereof, a one-half wave type discriminator demodulator means receiving the amplified transducer signal comprising, a second transformer having a primary winding connected to the output of said amplifier means to receive the amplified transducer signal and a secondary center tapped winding inductively coupled to said primary winding, a center tapped resistor element, a first diode having one terminal connected to an end of said center tapped resistor and the other terminal connected to one end terminal of said secondary center tapped winding, a second diode having one terminal connected to the other end of said center tapped resistor and the other terminal connected to the other end terminal of said secondary center tapped winding, one terminal of said third secondary winding of said first transformer connected to the center terminal tap of said center tapped resistor and the other terminal connected to the center terminal tap of said secondary center tapped winding of said second transformer, the output of said discriminator being the end terminals of said center tapped resistor, a switching means connected to the output of said discriminator means comprising, first and second transistors, each transistor having a base, an emitter, and a collector, first conductor means connecting one end terminal of said tapped resistor to the base of said first transistor, second conductor means connecting the other end terminal of said tapped resistor and the base of said second transistor, a third conductor connecting the emitters of said first and second transistors, first and second diodes, said first diode being connected across said one end terminal of said tapped resistor and said third conductor, said second diode connected across said other end terminal of said tapped resistor and said third conductor, first and second relay switches, said first relay operative when activated to energize a heating apparatus associated with liquid bath, said second relay switch when energized operative to energize a cooling apparatus associated with said liquid bath, fourth conductor means connected to one terminal of said rectifier means and said third conductor means, a fifth conductor means connecting the other terminal of said rectifier means and terminals of said first and second relay switches, sixth conductor means connecting the collector of said first transistor and the other terminal of said first relay switch, seventh conductor means connecting said collector of said second transistor and the other terminal of said second relay switch, first and second condensers connected across the terminals of respective relay switches, said control means in use adapted to maintain a constant temperature in said liquid bath by sensing temperature deviations therein from the desired operating temperature and produce a signal in the transducer, the phase of said signal dependent on whether the deviation is above or below the desired temperature and the amplitude of the signal dependent on magnitude of the deviation, feed the signal to a discriminator which compares the signal with a reference, and utilize the resultant output to activate the appropriate cooling or heating apparatus to correct the deviation.

2. A control means for maintaining a constant environment in a system by detecting and applying corrective measures to compensate for environmental deviations in the system from the desired condition comprising, a source of alternating voltage, a first transformer having a primary winding operatively connected to said source of voltage, a first secondary winding and a secondary winding, a transducer comprising, an element sensitive to environmental deviations in the system which responds by varying the electrical resistance, a Wheatstone bridge circuit having two resistors in series in one arm, and a variable resistor and said element in series in the other arm, means connecting the terminal ends of the arms of said Wheatstone bridge circuit to said first secondary winding of said first transformer, transducer signal output terminals on said Wheatstone bridge circuit, one terminal being between the resistors on the one arm, and the other terminal being between said variable resistor and said element in the other arm, an amplifier means receiving the resultant signal from said terminals of said transducer, a one-half wave type discriminator demodulator means receiving the amplified transducer signal from said amplifier means comprising, a second transformer having a primary winding connected to the output of said amplifier means to receive the resultant transducer signal, and a secondary center tapped winding inductively coupled to said primary winding, a center tapped resistor element, a first unilateral conduction device connected across one terminal of said secondary center tapped winding and one end terminal of said center tapped resistor element, a second unilateral conduction device connected in parallel to said first unilateral conduction device across the other end terminal of said secondary tapped winding and the other end terminal of said center tapped resistor element, one terminal of said second secondary winding of said first transformer connected to the center tap terminal of said center tapped resistor, and the other terminal of said winding connected to the center tap terminal of said secondary center tapped winding of said second transformer, the output of said discriminator demodulator means being the end terminals of said center tapped resistor, a switching means connected to said output of said discriminator means comprising, first and second transistors, each transistor having a base, an emitter, and a collector, said base of each of said transistors connected to one of said output terminals of said discriminator demodulator means, said emitters being connected, a third unilateral conduction device connected across one end terminal of said center tapped resistor and said emitters of said first and second PNP type transistors, a second unilateral conduction device connected across the opposite end terminal of said center tapped resistor and said emitters, a source of direct current of voltage connected to said emitters of said first and second transistors, first and second relay switches connected to energize apparatus to apply opposite corrective forces to said systems, said source of direct current voltage connected to terminals of said first and second relay switches, means connecting the collector of said first transistor to the opposite terminal of said first relay switch, connection means connecting the collector of said second transistor to the opposite terminal of said second relay switch, said control means in use adapted to produce a modulated signal with said transducer in response to an environmental deviation in said system, amplify said signal, demodulate the resultant amplified signal, and energize the appropriate apparatus to apply corrective force to said system to restore desired environment to the system.

3. A control means for maintaining a constant environment in a system by detecting and applying corrective measures to compensate for environmental deviations in the system from the desired condition comprising, a source of alternating voltage, a transducer having an element sensitive to environmental deviations in the system operably connected to said source of voltage and which responds by varying an electrical property of said element, an amplifier means connected to receive in operation a signal from said transducer and amplify same, a discriminator demodulator means having two differential output terminals and connected to receive in operation an amplified transducer signal from said amplifier means and demodulate such signal, a switching means having input terminals connected to said output terminals of said discriminator means and connected to receive the output of said discriminator comprising, first and second transistors, each transistor having a base, an emitter, and a collector, said base of each of said transistors connected to one of the input terminals of said switching means, said emitters being connected, a first diode connected across one of the input terminals of said switching means and said emitters of said first and second transistors, a second diode connected across the other input terminal of said switching means and said emitters, said diodes connected to provide a return to the input terminal for the base current of the opposite transistor while such transistor is in conduction in operation, a source of unilateral voltage connected to said emitters of said first and second transistors, first and second relay switches connected to energize apparatus to apply opposite corrective forces to said systems, said source of unilateral voltage connected to terminals of said first and second relay switches, means connecting the collector of said first transistor to the opposite terminal of said first relay switch, connection means connecting the collector of said second transistor to the opposite terminal of said second relay switch, said control means in use adapted to produce a modulated signal with said transducer in response to an environment deviation in said system, amplify said signal, and energize the appropriate apparatus to apply corrective force to said system to restore desired environment to the system.

4. A control means for maintaining a constant environment in a system by detecting and applying corrective measures to compensate for environmental deviations in the system from the desired condition comprising, a source of voltage, a transducer having an element sensitive to environmental deviations in the system operably connected to said source of voltage and which responds by varying an electrical property of said element, an amplifier means connected to receive in operation a signal from said transducer and amplify same, said amplifier means having two differential output terminals, a switching means having input terminals connected to said output terminals of said amplifier means and connected to receive the output of said amplifier means comprising, first and second transistors, each transistor having a base, an emitter, and a collector, said base of each of said transistors connected to one of the input terminals of said switching means, said emitters being connected, a first diode connected across one of the input terminals of said switching means and said emitters of said first and second transistors, a second diode connected across the other input terminal of said switching means and said emitters, said diodes connected to provide a return to the input terminal for the base current of the opposite transistor while such transistor is in conduction in operation, a source of unilateral voltage connected to said emitters of said first and second transistors, first and second relay switches connected to energize apparatus to apply opposite corrective forces to said systems, said source of unilateral voltage connected to terminals of said first and second relay switches, means connecting the collector of said first and second relay switches, means connecting the collector of said first transistor to the opposite terminal of said first relay switch, connection means connecting the collector of said second transistor to the opposite terminal of said second relay switch, said control means in use adapted to produce a signal with said transducer in response to an environmental deviation in said system, amplify said signal, and energize the appropriate apparatus to apply corrective force to said system to restore desired environment to the system.

5. A switching means for selectively energizing two associated electrical circuits in response to an electrical signal when the magnitude of said signal is outside of specified limits comprising, first and second input terminals, first and second transistors, each transistor having a base, an emitter, and a collector, first conductor means connecting said first input terminal to the base of said first transistor, second conductor means connecting the second input terminal and the base of said second transistor, a third conductor connecting the emitters of said first and second transistors, first and second diodes, said first diode connected across said first input terminal and said third conductor, said second diode connected across said second input terminal and said third conductor, said diodes connected to provide a return to the input terminal for the base current of the opposite transistor while such transistor is in conduction in operation, first and second relay switches, said first relay switch operative when activated to energize a first associated electrical circuit, said second relay switch operative when activated to energize an associated second electrical circuit, said first and second relay switches having input and output control terminals, a source of unilateral voltage connected across said third conductor and the output control terminals of said relay switches, fourth conductor means connecting the collector of said first transistor and the input control terminal of said first relay switch, fifth conductor means connecting the collector of said second transistor and the input control terminal of said second relay switch, said switch means adapted to selectively activate either said first associated circuit means or said second associated circuit means in response to a control signal to said first and second input terminals of said switching means when the magnitude of said signal is outside of specified limits.

References Cited by the Examiner

UNITED STATES PATENTS

| | | | |
|---|---|---|---|
| 2,654,057 | 9/1953 | Rivenburg | 318—20.810 |
| 2,860,298 | 11/1958 | Carlson | 318—20.810 |
| 2,886,755 | 5/1959 | Ehret et al. | 318—20.810 |

ROBERT A. O'LEARY, *Primary Examiner.*

CHARLES SUKALO, *Examiner.*